(12) United States Patent
Jing

(10) Patent No.: US 9,035,602 B2
(45) Date of Patent: May 19, 2015

(54) WIRELESS BATTERY CHARGER FOR MOBILE DEVICES AND METHOD THEREOF

(75) Inventor: Tao Jing, Fremont, CA (US)

(73) Assignee: Silicon Spread Corporation, San Jose, CA (US)

( * ) Notice: Subject to any disclaimer, the term of this patent is extended or adjusted under 35 U.S.C. 154(b) by 384 days.

(21) Appl. No.: 13/594,673

(22) Filed: Aug. 24, 2012

(65) Prior Publication Data

US 2014/0055078 A1 Feb. 27, 2014

(51) Int. Cl.
*H02J 7/00* (2006.01)
*H02J 7/02* (2006.01)
*H02J 5/00* (2006.01)

(52) U.S. Cl.
CPC .............. *H02J 7/0044* (2013.01); *H02J 7/0036* (2013.01); *H02J 5/005* (2013.01); *H02J 7/0034* (2013.01); *H02J 7/025* (2013.01)

(58) Field of Classification Search
CPC .......... H02J 7/0034; H02J 5/005; H02J 7/025
USPC .................................................. 320/103, 108
See application file for complete search history.

(56) References Cited

U.S. PATENT DOCUMENTS

| | | | |
|---|---|---|---|
| 5,666,605 A * | 9/1997 | Tokimatsu et al. | 399/173 |
| 6,972,543 B1 | 12/2005 | Wells | |
| 7,392,068 B2 | 6/2008 | Dayan et al. | |
| 2006/0145658 A1 | 7/2006 | Wang | |
| 2010/0012725 A1* | 1/2010 | Zemba et al. | 235/451 |
| 2013/0036906 A1* | 2/2013 | Dunn | 95/70 |
| 2014/0194160 A1 | 7/2014 | Jing et al. | |
| 2014/0283686 A1* | 9/2014 | Dunn | 95/78 |

* cited by examiner

*Primary Examiner* — Vuthe Siek
(74) *Attorney, Agent, or Firm* — Edward C. Kwok; Hogan Lovells US LLP

(57) ABSTRACT

A wireless direct contact charger includes (a) a voltage supply; (b) a first plate electrode and a second plate electrode; (c) a polarity detection circuit that detects; and (d) a switching circuit. When the first electrode or the second electrode of the portable device is placed on the first plate electrode or the second plate electrode, the polarity detection circuit detects the polarity of the portable device charging terminals (i.e, whether the first electrode of the portable device is in contact with the first plate electrode, the second electrode of the portable device is in contact with the first plate electrode or any other suitable orientations). Based on the detected polarity, the switching circuit connects the first plate electrode and the second plate electrode to the voltage supply to provide an output voltage to the portable device for charging its battery.

17 Claims, 11 Drawing Sheets

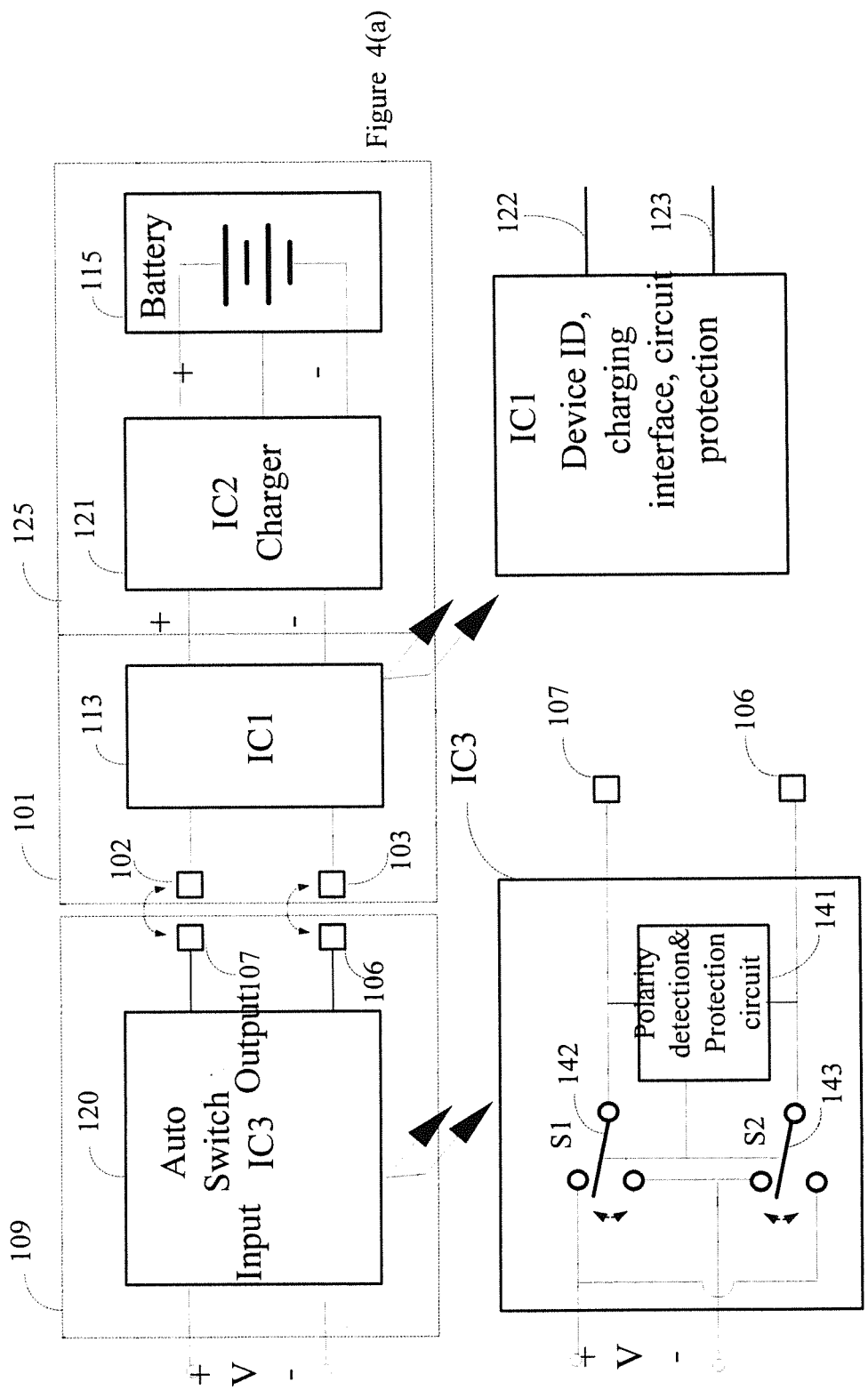

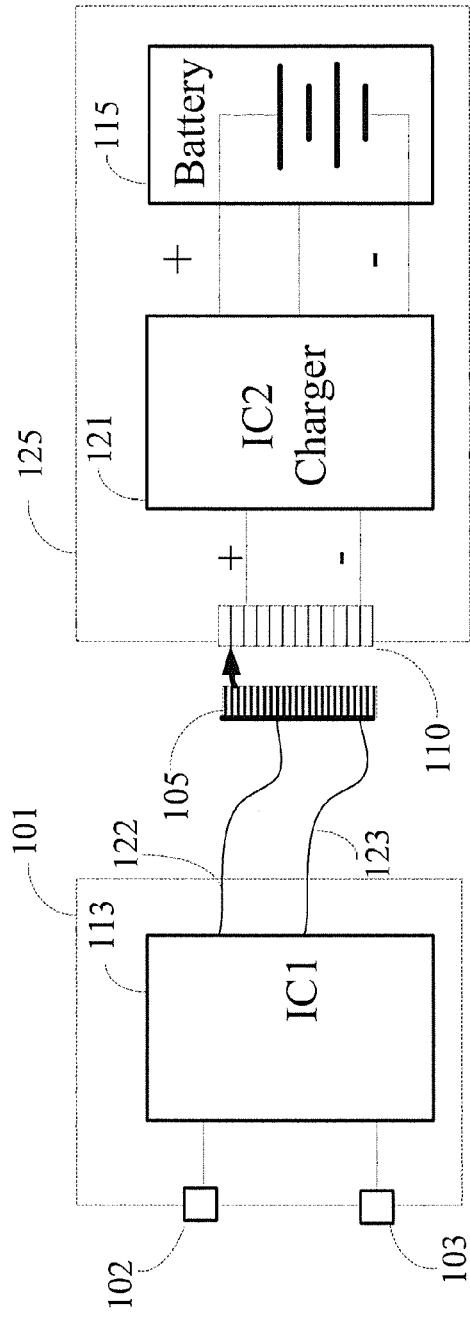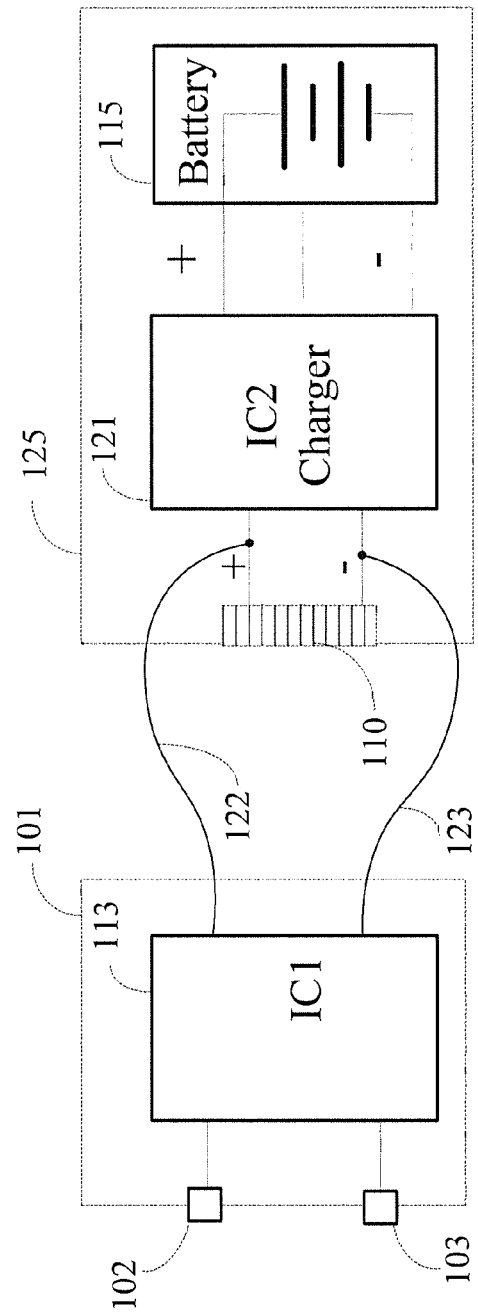
Figure 6
Figure 7

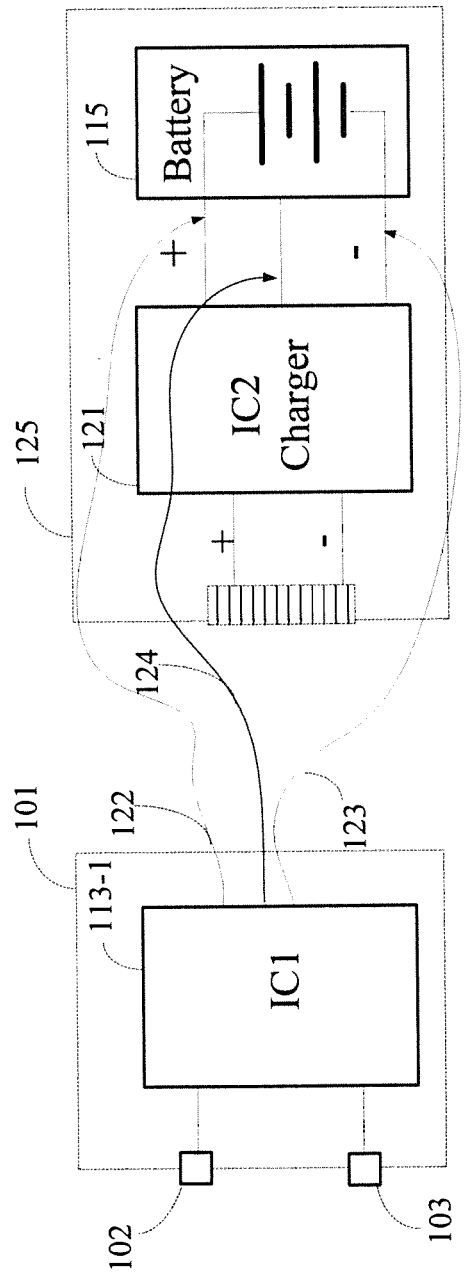
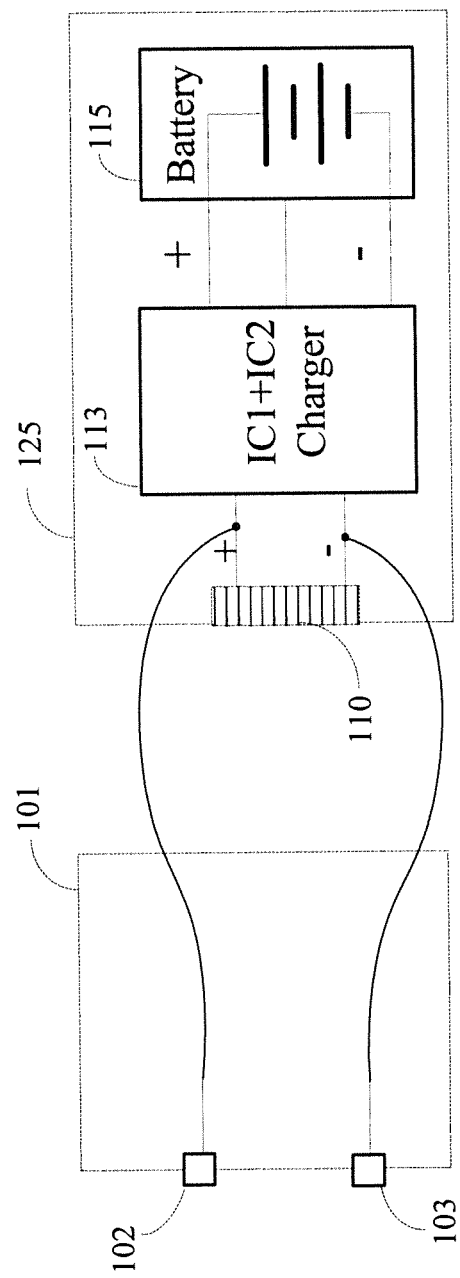
Figure 9
Figure 11

WIRELESS BATTERY CHARGER FOR MOBILE DEVICES AND METHOD THEREOF

BACKGROUND OF THE INVENTION

1. Field of the Invention

The present application relates to a wireless battery charger for mobile or portable devices (e.g., cellular telephones). In this context, "wireless" refers to the fact that the charger charges the battery of a portable device through a mechanism that does not involve connecting the portable device to the charger by a cable. In particular, the present application relates to a universal wireless battery charger that does not have the disadvantages of a battery charger that is based on inductive coupling.

2. Discussion of the Related Art

There are two main categories of wireless battery chargers for portable devices. One category transfers energy by providing direct contact between the portable device and the charger or the charging base station ("direct contact charger"). The second category relates to using an electromagnetic field to transfer energy between the portable device and the wireless charger. A wireless battery charger that transfers energy through inductive coupling ("inductive charger") typically includes a first induction coil that creates an alternating electromagnetic field from the inductive charger. The alternating electromagnetic field from the inductive charger then induces an electrical current in a second induction coil in a properly positioned the portable device. This inducted electrical current then charges the battery of the portable device. The two induction coils in proximity together form, essentially, an electrical transformer.

Charging by inductive coupling suffers from many disadvantages. For example, relative to charging by direct contact, an inductive charger typically has low efficiency and experiences resistive heating. As the lack of efficiency manifests itself in energy loss in the form of heat, an inductive charger gets quite warm during charging operations. The resulting elevated temperature causes undue stress on the battery being charged. Consequently, the batteries in portable devices that are charged by such a charger do not last as long as those regularly charged by a plug-in charger. There are two additional aspects of an inductive charger that should be noted. First, the heat build-up occurs only during charging operations. Second, the efficiency that is achieved also depends heavily on the relative positions of the two coupled coils. Implementations using a lower frequency or using an older drive technology may charge more slowly and generates heat within most portable electronic devices. Further, inductive charging requires specific electronic circuits and coils in both the inductive charger and the mobile device being charged, thereby resulting in both increased complexity and increased cost of manufacturing such devices. See, for example, U.S. Pat. No. 6,972,543, entitled "Series Resonant Inductive Charging Circuit," issued Dec. 6, 2005. The public is also concerned about the alternating electromagnetic fields, which typically operates at a radio frequency within the range of 80-300 kHz. Even at 5 watts, such electromagnetic fields may still cause significant health concerns to human beings nearby. Some stations transmit at 915 MHz, which is the frequency often used to heat food in microwave ovens.

A wireless direct contact charger transfers energy without the disadvantages of an inductive charger. One way of implementing a wireless direct contact charger is to provide "point-to-point electrodes" i.e., providing electrodes in a base station of the charger that couple with corresponding electrodes in the portable device being charged, e.g., a home wireless telephone. Such a charging arrangement requires that the electrodes on the portable device be completely aligned to the corresponding electrodes in the base station, and be oriented in the correct polarities. Another way of implementing a direct contact charger is to provide "multiple point electrodes," such as providing electrodes in the form of strips. One example of a multi-point direct contact charger is a charger marketed under the trade name "Wildcharge System." In that system, the electrodes are provided as numerous parallel strips of alternating polarities on a charging surface of the housing of the direct contact charger. A portable device to be charged is required to have multiple electrodes formed along the circumference of a small circle. The electrodes are usually located at the center of mass of the portable device, so that when the portable device is placed on the charging surface of the charger, the multiple electrodes on the portable device support the portable device on the charging surface without tilting. If device is tilted, electrical contact with the charger would be lost. If the portable device is placed in an incorrect position, charging operations may fail (e.g., when two of the electrodes on the portable device sit in between adjacent electrode strips).

SUMMARY

The present invention provides two or more conducting plates as electrodes on a surface provided in a wireless direct contact charger, so that the portable device to be charged can be placed in any position on the charging surface without potential disconnection.

According to one embodiment of the present invention, a wireless direct contact charger charges a portable device that has a first electrode and a second electrode provided on one surface of a housing of the portable device. The wireless direct contact charger of the present invention may include (a) a voltage supply; (b) a first plate electrode and a second plate electrode; (c) a polarity detection circuit; and (d) a switching circuit. When the first electrode or the second electrode of the portable device is placed on the first plate electrode or the second plate electrode, the polarity detection circuit detects the polarity of the portable device charging terminals (i.e, whether the first electrode of the portable device is in contact with the first plate electrode, the second electrode of the portable device is in contact with the first plate electrode, or any other suitable orientations, etc.). Based on the detected polarity, the switching circuit connects the first plate electrode and the second plate electrode to the voltage supply to provide an output voltage to the portable device for charging its battery, Of particular note is that the first plate electrode and the second plate electrode of the wireless direct contact charger each have linear dimensions less than the distance between the first electrode and the second electrode of the portable device, so that the portable device is always in the correct charging position when properly placed on the wireless direct contact charger. The voltage supply in the wireless direct contact charger may be a battery, so that such a charger may itself be portable.

According to one embodiment of the present invention, a back cover is provided to a portable device. The portable device may include a battery charging subsystem that charges a battery powering the portable device, the back cover being provided to allow charging of the portable device by a wireless direct contact charger having a first plate electrode and a second plate electrode. The back cover includes a first electrode and a second electrode embedded in the back cover each being electrically connected to the charging subsystem of the portable device. Of particular note is that the distance between the first electrode and the second electrode of the portable device is greater than each of the linear dimensions of the first plate electrode and the second plate electrode of the wireless direct contact charger. The first electrode may include a metallic annular ring, such as an annular ring that customary surrounds an opening for the objective lens of a camera in the portable device. The second electrode may be part of a logo, a trademark, lettering or another feature that identifies the manufacturer or the model number of the portable device. An additional battery may be mounted on the back cover, together with a battery charging circuit in the charger interface circuit.

The back cover may include a charger interface circuit that couples the first electrode and the second electrode to corresponding terminals of the charging subsystem. Such connections may be achieved through a connector, such as a USB connector, or through metallic contact elements provided on the back cover and a circuit board on which the battery charging subsystem resides. Alternatively, such connections may be metallic contact elements provided on the back cover and the battery directly.

According to one embodiment of the present invention, a method for charging a portable device of the present invention by a wireless direct contact charger is provided. The method may include: (a) determining if the portable device is properly placed on either one or both of the first plate electrode and the second plate electrode; (b) if the electronic device is properly placed on either or both of the first plate electrode and the second plate electrode, sending an electrical stimulus signal and measuring a response to determine a polarity of the first plate electrode and the second plate electrode of the portable device; (c) setting the switching circuit to an appropriate configuration to provide an output voltages to the first plate electrode and the second plate electrode; and (d) outputting a charging voltage to the first plate electrode and the second plate electrode through the switching circuit. The method may further include receiving from the portable device one or more signals representing status information regarding charging in the portable device, and displaying the status information on the wireless direct contact charger.

The present invention provides the advantage that no more than two electrodes are required for each portable device to be charged. Also, the electrodes on the portable device is not required to be at or near its center of mass. The two electrodes on the portable device may be placed at any position, so long as the distance between the electrodes is greater than a linear dimension of an electrode plate on the charger.

The present invention is better understood upon consideration of the detailed description below in conjunction with the accompanying drawings.

BRIEF DESCRIPTION OF THE DRAWINGS

FIG. 4(a) illustrates the component circuits involved in the charging operations when wireless direct contact charger 10 and portable device 100 are engaged, according to one embodiment of the present invention.

FIG. 4(b) is a schematic circuit representation of auto-switching and protection circuit 120 of FIG. 4(a).

FIG. 4(c) is a schematic circuit representing integrated circuit 113 with terminals 122 and 123.

FIG. 6 shows terminals 122 and 123 of integrated circuit 113 being connected to charging subsystem 125 of portable device 100 through connector 105, according to one embodiment of the present invention.

FIG. 7 shows terminals 122 and 123 of integrated circuit 113 being connected to charging subsystem 125 of portable device 100 without providing connector 105, according to an alternative embodiment of the present invention.

FIG. 9 shows terminals 122 and 123 of integrated circuit 113 being connected directly to terminals on battery 115 of charging subsystem 125 in portable device 100, according to one embodiment of the present invention.

FIG. 11 shows, in one configuration, integrated circuit 113 being integrated into integrated circuit 121 in charging subsystem 125 of portable device 100, according to another embodiment of the present invention.

DETAILED DESCRIPTION OF THE PREFERRED EMBODIMENTS

Figure 1:
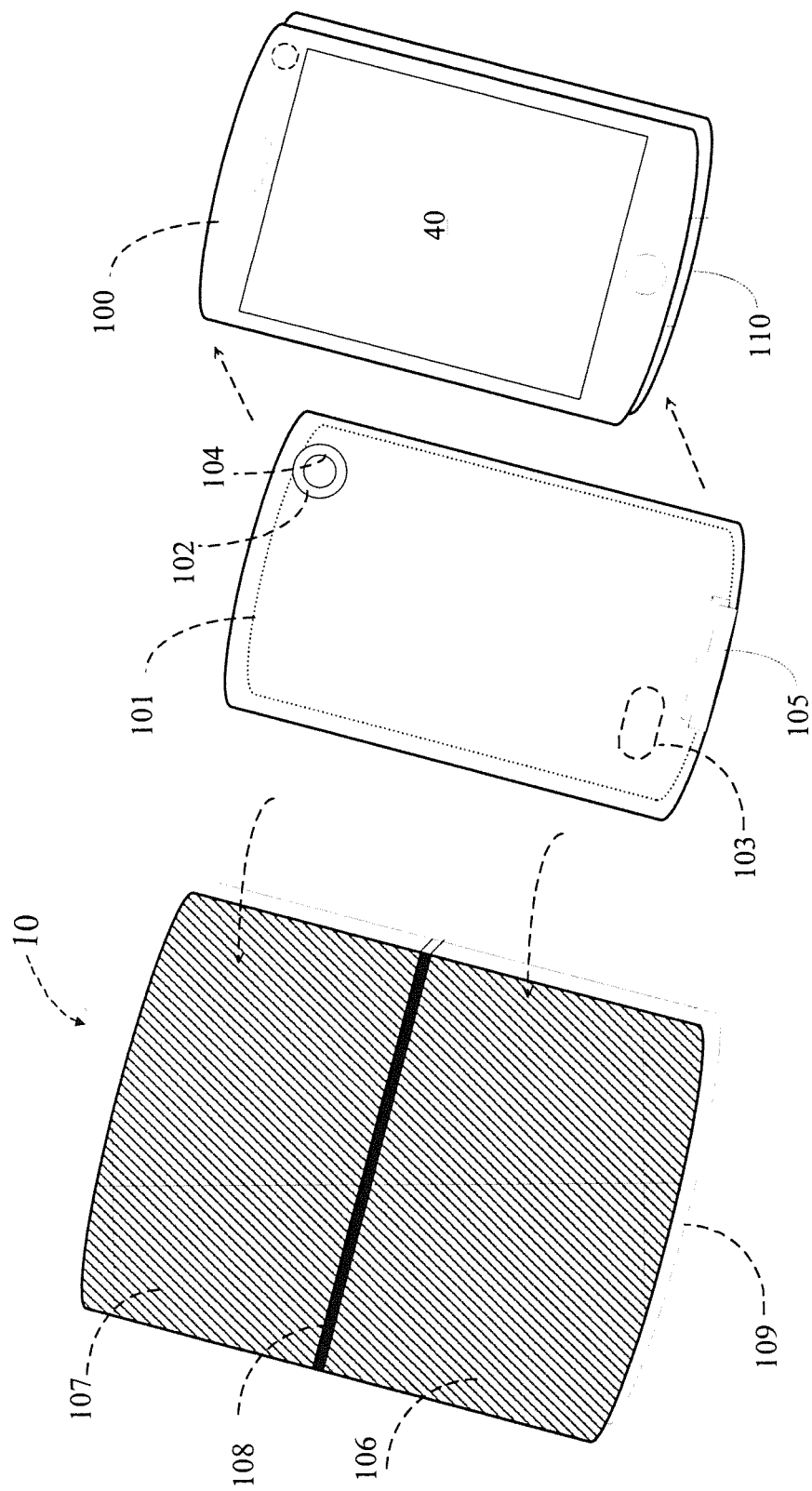
FIG. 1(a) shows wireless direct contact charger 10, having plate electrodes 106 and 107, according to one embodiment of the present invention.
FIGS. 1(b)(i) and 1(b)(ii) show, respectively, back cover 101 and portable device 100 (e.g., a cellular telephone) with back cover 101 removed, according to one embodiment of the present invention.

The present invention provides, according to one embodiment, a direct contact charger—such as that illustrated in FIG. 1(a)—and methods associated therewith. As shown in FIG. 1(a), wireless direct contact charger 10 includes housing 109 which includes, on one surface, plate electrodes 106 and 107 that are electrically insulated from each other by insulator strip 108. Plate electrodes 106 and 107 may each be provided by an electrically conductive material, such as a metal plate. Electrodes 106 and 107 are provided to contact the electrodes for charging a battery in a portable device, such as portable device 100 illustrated in FIGS. 1(b)(i) and 1(b)(ii).

FIGS. 1(b)(i) and 1(b)(ii) show, respectively, back cover 101 and portable device 100 (e.g., a cellular telephone) with back cover 101 removed. As shown in FIG. 1(b)(ii), portable device 100 includes graphical display 40, and receptacle 110, which accommodates a custom or standard connector (e.g., connector 105 of FIG. 1(b)(i)), to provide a data interface and, optionally, charging terminals for charging a battery in portable device 100. Back cover 101 may be an add-on accessory to portable device 100 or built into portable device 100. As shown in FIG. 1(b)(i), as an add-on accessory to portable device 100, back cover 101 is designed to slip over the housing of portable device 100 and includes opening 104 for exposing an objective lens of a camera in portable device 100, and charging electrode 103. Opening 104 is framed by a metallic ring 102, which acts as a first charging electrode that is used in conjunction with wireless direct contact charger 10 of FIG. 1(b)(i). Metallic ring 102, which may be an annular element of any shape (e.g., round) is already typically used in many portable devices, such as "smartphones", so that adding the capability of being charged by a wireless direct contact charger of the present invention to such a portable device can be accomplished at minimal cost (i.e., by connecting metallic ring 102, an already commonly available component, to the charging circuit). Charging electrode 103, which provides a second electrode to the charging circuit of portable device 100 may be provided by any conductive surface on back cover 101. In many portable devices, such a conductive surface may already be readily found on the back cover. For example, it is customary to attach a logo, a trademark, lettering or other features to identify the manufacturer or the model number of the portable device. To use such a feature as charging electrode 103, such a feature merely needs to have a conductive surface. Any such conductive surface may be used to provide second charging electrode 103, so long as it is electrically insulated from metallic ring 102 that serves as first charging electrode. Therefore, as in the case of metallic ring 102, adding the capability of being charged by a wireless direct contact charger can be accomplished at minimal cost by connecting charging electrode 103—which also may be provided by any suitable already commonly available component—to the charging circuit. As additional precaution against electrical shorting, back cover 101 may also be electrically insulated from both metallic ring 102 and charging electrode 103. The separation between the first charging electrode (e.g., metallic ring 102) and the second charging electrode (e.g., charging electrode 103) is preferably greater than any linear distance within the plate electrode 106 or plate electrode 107, to avoid accidental shorting of these electrodes when portable device 100 is placed on wireless direct contact charger 10. Also, as discussed below, because of the designed separation between the charging electrodes, when portable device 100 is placed properly on wireless direct contact charger 10, portable device 100 would be in position for charging operation without further alignment.

Figure 2:
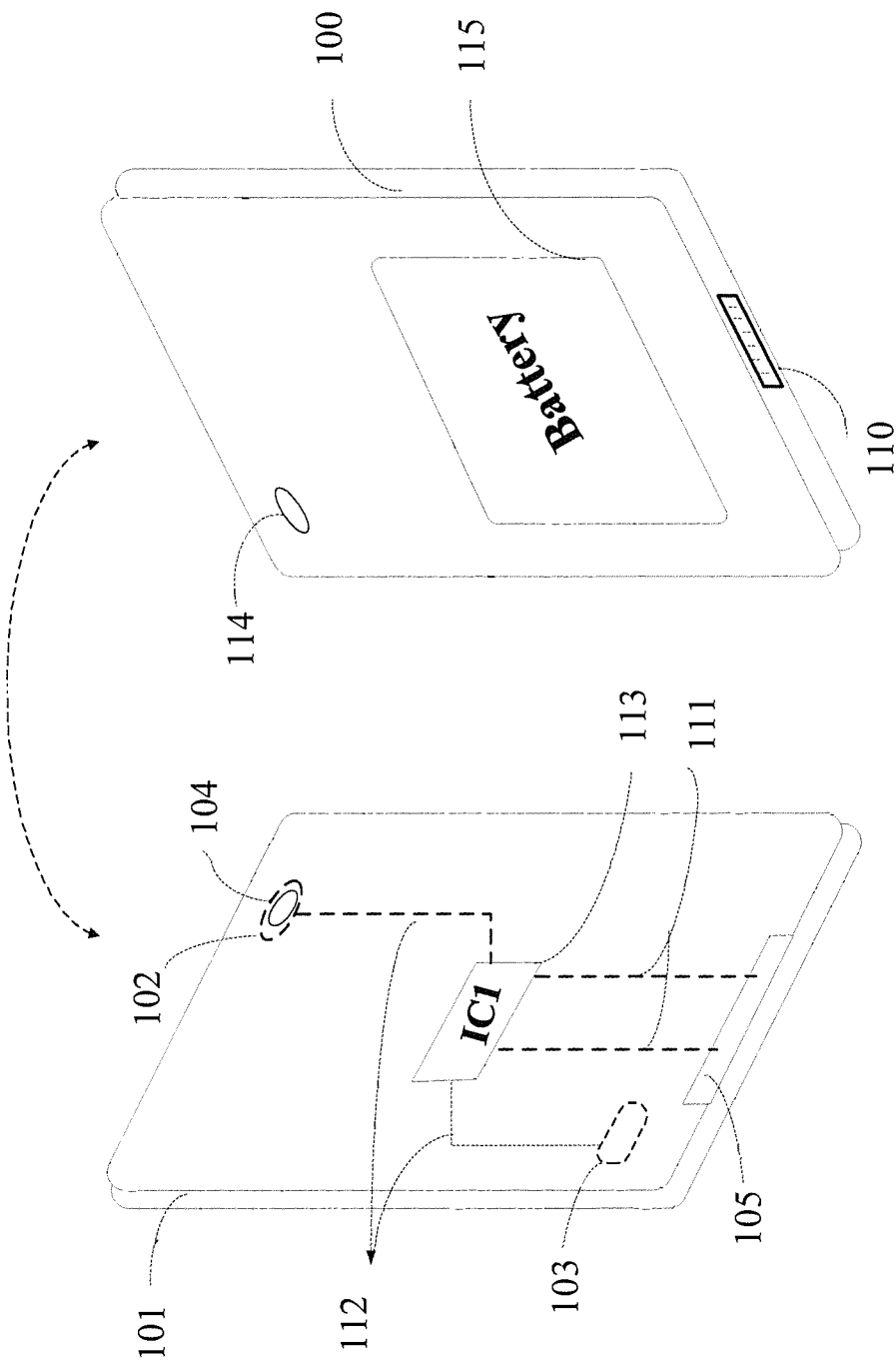
FIGS. 2(a) and 2(b) illustrate a charging interface circuit within portable device 100, in accordance with one embodiment of the present invention.

FIGS. 2(a) and 2(b) illustrate a charging circuit within portable device 100, in accordance with one embodiment of the present invention. As shown in FIG. 2(a), which shows an interior surface of back cover 101, an integrated circuit 113 is provided which is wired to connect relevant terminals of integrated circuit 113 to metallic ring 102 (i.e., the first electrode) and charging electrode 103 to the pins of connector 105. Connector 105 may include data terminals and power terminals that may be used to charge portable device 100 by a plug-in charger. For example, connector 105 may be a USB connector. For this application, integrated circuit 113 may include an interface to any conventional power management circuit for charging a battery in portable device 100. Integrated circuit 113 may also include a protection circuit to protect portable device 100 from high voltage, high current or other electrical hazards. FIG. 2(b) illustrates portable device 100 with back cover 101 removed. As shown in FIG. 2(b), installed in portable device 100 are camera 114 and battery 115, which may be the battery to be charged.

Figure 3:
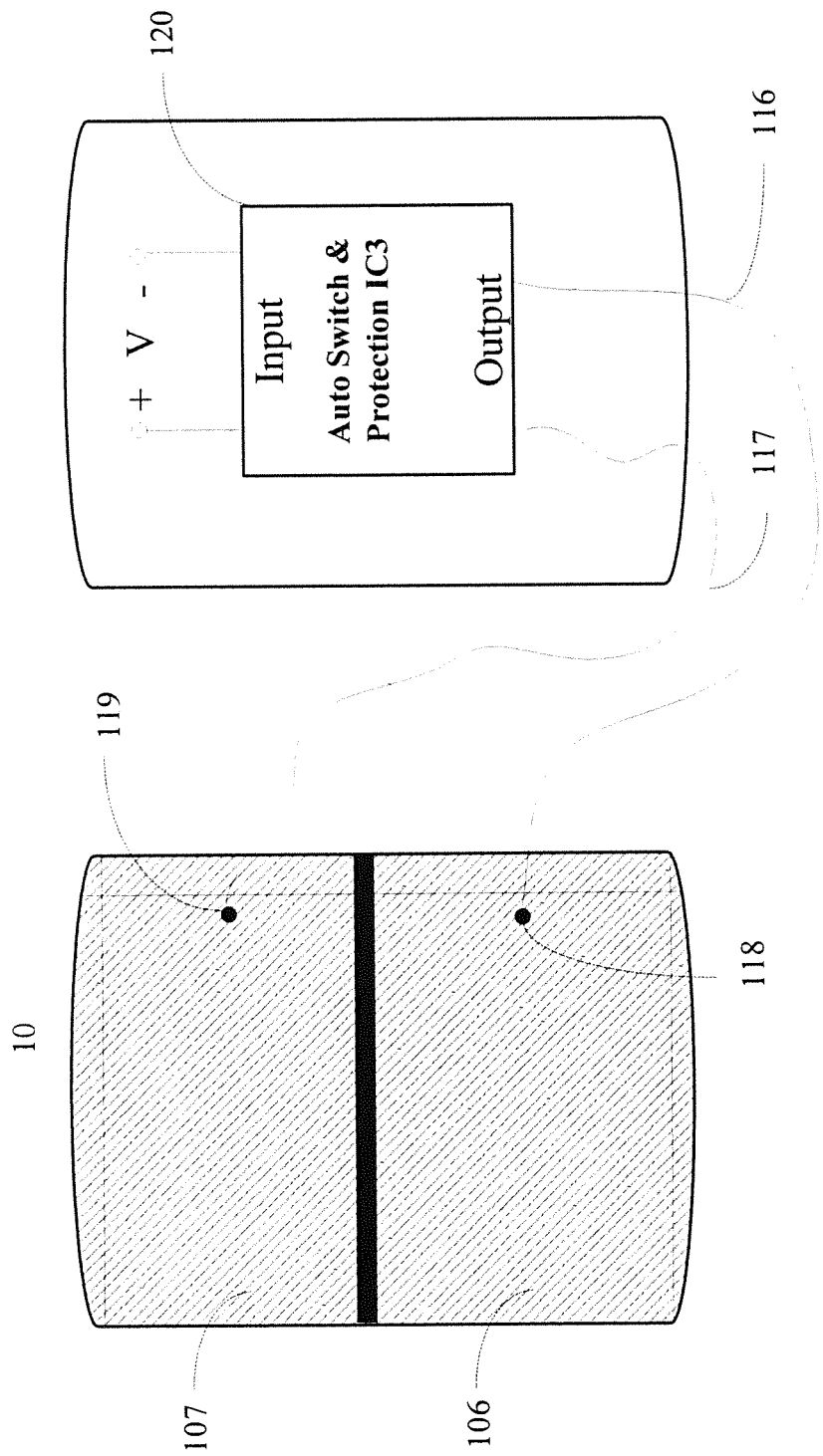
FIG. 3 shows auto-switching and protection circuit 120 provided in wireless direct contact charger 10, in accordance with one embodiment of the present invention.

FIG. 3 shows auto-switching and protection circuit 120 provided in wireless direct contact charger 10, in accordance with one embodiment of the present invention. As shown in FIG. 3, plate electrodes 106 and 107 are respectively connected at connection points 118 and 119 to a control circuit, identified as auto-switching and protection circuit 120, which may be provided as an integrated circuit. As discussed below, auto-switching and protection circuit 120 provides the charging output voltage on electrodes 107 and 108, detects the polarities of the electrodes on a device to be charged that is placed on wireless direct contact charger 10, and includes sensors that prevent accidental shorting, Auto-switching and protection circuit 120 may also includes a protective circuit that protects against electrostatic discharge. A power source, e.g., a regulated power supply, provides power to auto-switching and protection circuit 120.

FIG. 4(a) illustrates the component circuits involved in the charging operations when wireless direct contact charger 10 and portable device 100 are engaged, according to one embodiment of the present invention. As shown in FIG. 4(a), inside housing 109 of wireless direct contact charger 10 is auto-switching and protection circuit 120, which receives regulated power V, and is connected to electrodes 106 and 107. FIG. 4(b) is schematic circuit representation of auto-switching and protection circuit 120 of FIG. 4(a), which includes switches 142 and 143 and polarity detection and protection circuit 141. Auto-switching and protection circuit 120 performs the following functions:

(a) determining if a supported electronic device is placed on electrodes 106 and 107, auto-switching and protection circuit 120 providing a protective function to prevent damage to wireless direct contact charger from damages from an unsupported electronic device;

(b) if an electronic device is placed on electrodes 106 and 107, sending an electrical stimulus signal through electrodes 106 and 107 and measuring the response to determine the polarity of electrodes 102 and 103 of the device to be charged[1];

[1] That is, whether or not electrode 102 is in contact with electrode 106, electrode 102 is in contact with electrode 107, electrode 103 is in contact with electrode 106, or electrode 103 is in contact with electrode 107.

(c) after the polarities of electrodes 102 and 103 of the device to be charged is determined in polarity detection and protection circuit 141, power switches 142 and 143 are reset to the appropriate configuration to provide output voltages on first and second electrodes 106 and 107 to match the detected polarities of electrodes 102 and 103 of the electronic device;

(d) auto-switching and protection circuit 120 outputting a charging voltage to properly charge the electronic device placed on electrodes 106 and 107; and (e) taking proper action when the battery of the electronic device is fully charged, such as reducing the output current, and sending a "fully charged" indication signal.

Auto-switching and protection circuit 120 may also monitor the temperature in the surrounding; In one embodiment, Auto-switching and protection circuit 120 may shut off all power when a temperature above a preset threshold is detected. Wireless direct contact charger 10 is expected to be highly efficient in delivering power at 5 volts and currents between 200 mA to greater than 1 A. For example, if portable device 100 is charged over a USB 2.0 interface, portable device 100 may draw up to 500 mA. if portable device 100 is charged over a USB 3.0 interface, portable device 100 may draw up to 1 A.

In FIG. 4(a), in the charging subsystem on the device side (i.e., charging subsystem 125 of portable device 100), integrated circuit 113 is provided on back cover 101 of portable device 100, as discussed above. FIG. 4(c) shows integrated circuit 113 with terminals 122 and 123. As shown in both FIGS. 4(a) and 4(c), integrated circuit 113 provides a properly polarized charging voltage across terminals 122 and 123. This charging voltage is provided to integrated circuit 121. Integrated circuit 121 may be, for example, a charging circuit, which regulates the charging operations of battery 115, as shown in FIG. 4(a).

Figure 5B:
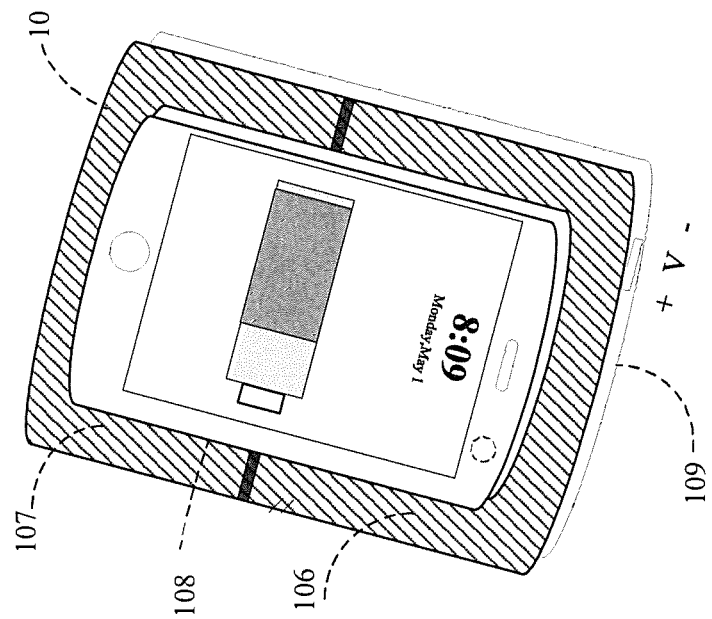
FIGS. 5(a) and 5(b) show portable device 10 being placed on wireless direct contact charger 10 in two configurations of opposite polarities.
Figure 5A:
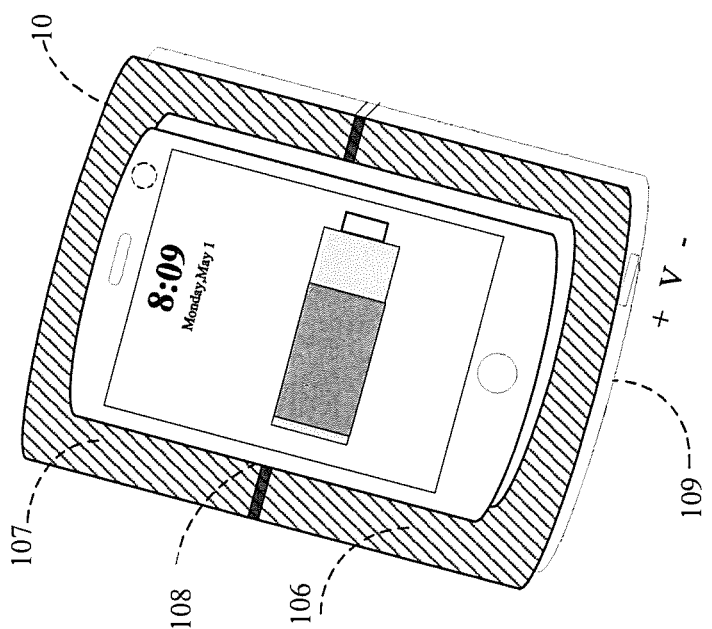

FIGS. 5(a) and 5(b) show portable device 100 being placed on wireless direct contact charger 10 in two configurations of opposite polarities. As explained above, because switches 142 and 143 of auto-switching and protection circuit 120 set the proper polarities on plate electrodes 106 and 107, the voltage output at wireless direct contact charger on plate electrodes 106 and 107 are correctly set in either configuration.

FIG. 6 shows terminals 122 and 123 of integrated circuit 113 being connected to charging subsystem 125 of portable device 100 through connector 105, according to one embodiment of the present invention. In this configuration, back cover 101 may be an add-on accessory to portable device 100.

Figure 8:
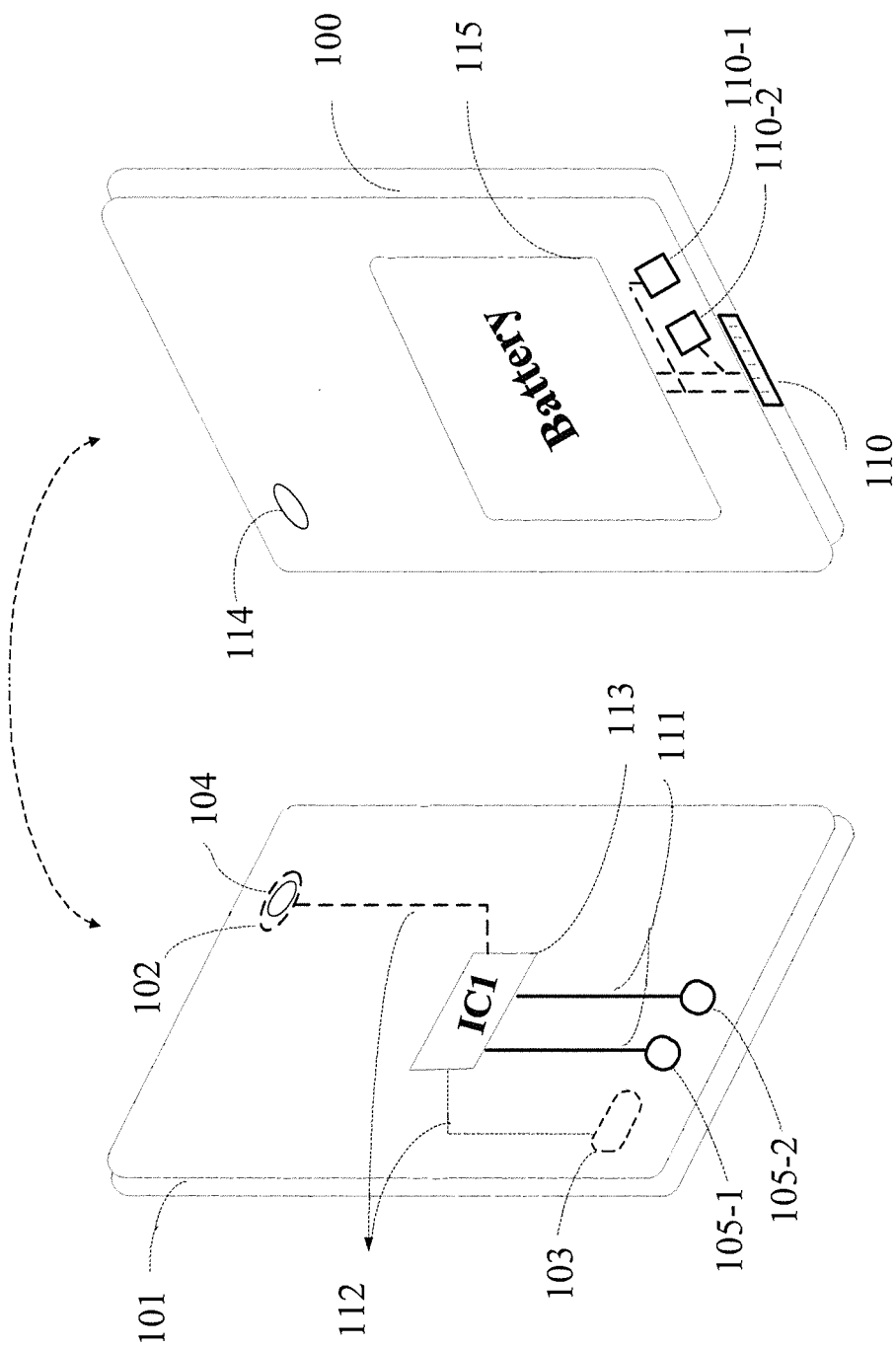
FIG. 8 illustrates one implementation of the configuration of FIG. 7, according to one embodiment of the present invention.

FIG. 7 shows terminals 122 and 123 of integrated circuit 113 being connected to charging subsystem 125 of portable device 100 without providing connector 105, according to an alternative embodiment of the present invention. Instead of providing connector 105, terminals 122 and 123 are directly connected into charging subsystem 125, leaving receptacle 110 available for an external data connection. One implementation of the configuration of FIG. 7 is illustrated in FIG. 8. As shown in FIG. 8, connection by terminals 122 and 123 to charging subsystem 125 are provided through conductive contact elements 105-1 and 105-2 on back cover 101 and conductive contact elements 110-1 and 110-2 on a circuit board on which charging subsystem 125 of portable device 100 resides.

Figure 10:
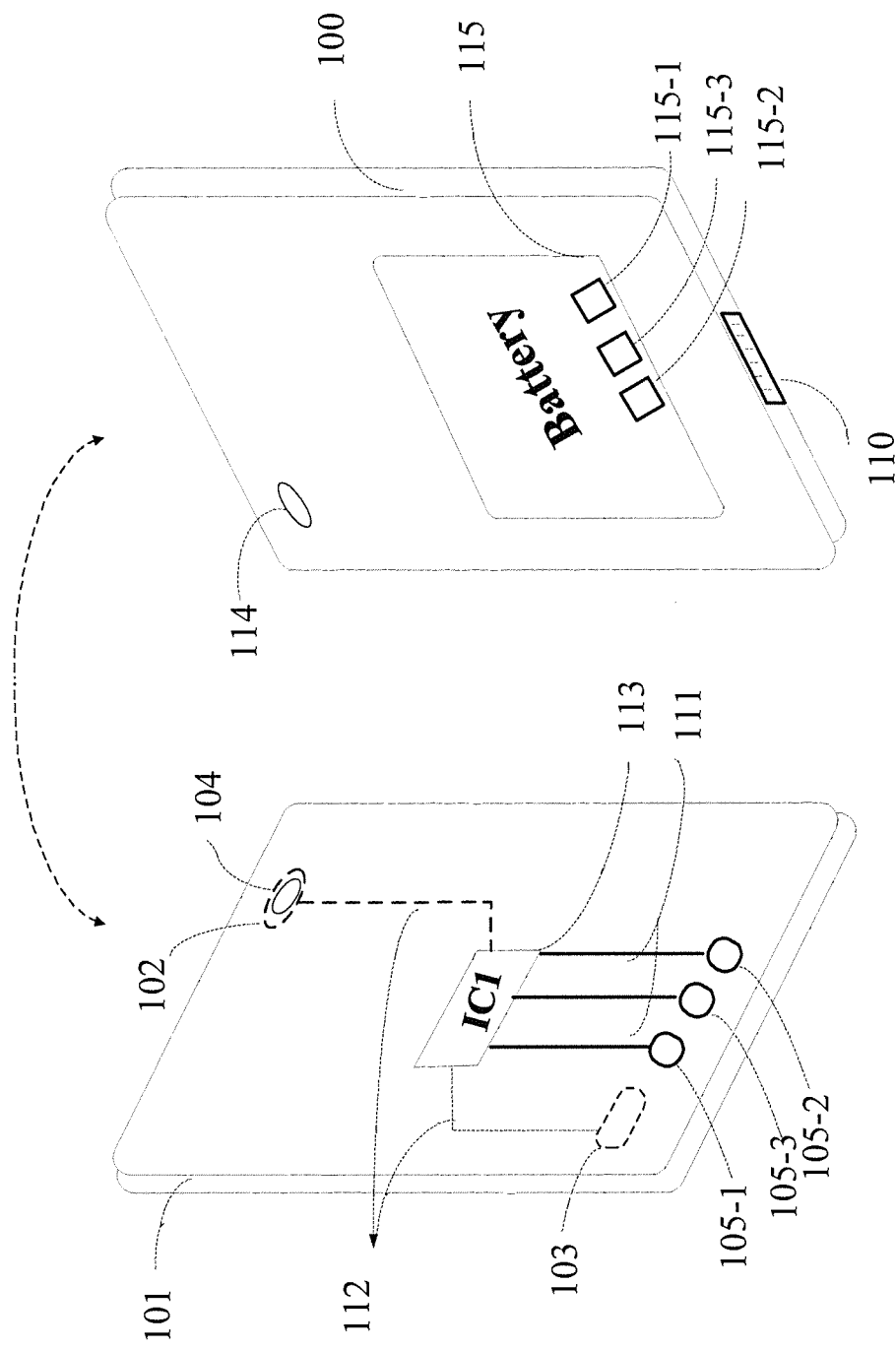
FIG. 10 illustrates one implementation of the configuration of FIG. 9, according to one embodiment of the present invention.

FIG. 9 shows terminals 122 and 123 of integrated circuit 113-1 being connected directly to terminals on battery 115 of charging subsystem 125 in portable device 100, according to one embodiment of the present invention. In this instance, integrated circuit 113-1 includes the capability of managing the charging of battery 115 with or without involving integrated circuit 121. As shown in FIG. 9, another terminal 124 of integrated circuit 113-1 is connected to a third terminal on battery 115. In many batteries, a terminal is provided for temperature sensing. Terminal 124 may connect to the temperature sensing terminal of battery 115, to allow integrated circuit 113 to monitor the temperature in battery 115. One implementation of the configuration of FIG. 9 is illustrated in FIG. 10. As shown in FIG. 10, connection by terminals 122, 123 and 124 to charging subsystem 125 are provided through conductive contact elements 105-1, 105-2 and 105-3 on back cover 101 and conductive contact elements 110-1, 110-2 and 110-3 on a circuit board on which charging subsystem 125 of portable device 100 resides.

Figure 12:
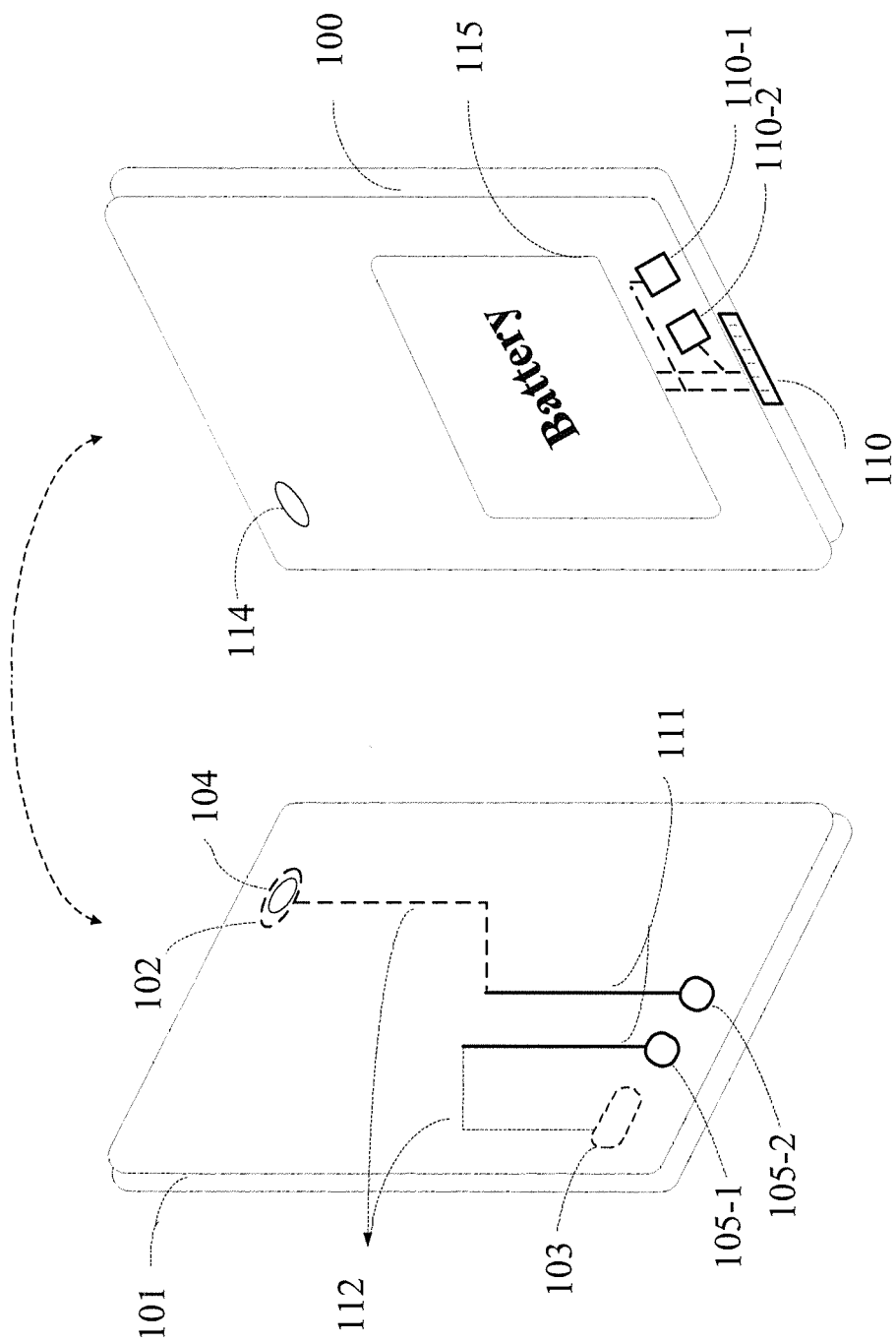
FIG. 12 illustrates one implementation of the configuration of FIG. 11, according to one embodiment of the present invention.

According to another embodiment of the present invention, integrated circuit 113 may be integrated into integrated circuit 121 in charging subsystem 125 of portable device 100, as illustrated in FIG. 11. In such a configuration, the circuitry on back cover 101 need include only metallic ring 102 and charging electrode 103. One implementation of the configuration of FIG. 11 is illustrated in FIG. 12. As shown in FIG. 12, metallic ring 102 and charging electrode 103 are connected to conductive contact elements 105-1 and 105-2 by conductive traces on back cover 101 and conductive contact elements 110-1 and 110-2 on a circuit board on which charging subsystem 125 of portable device 100 resides.

Figure 13:
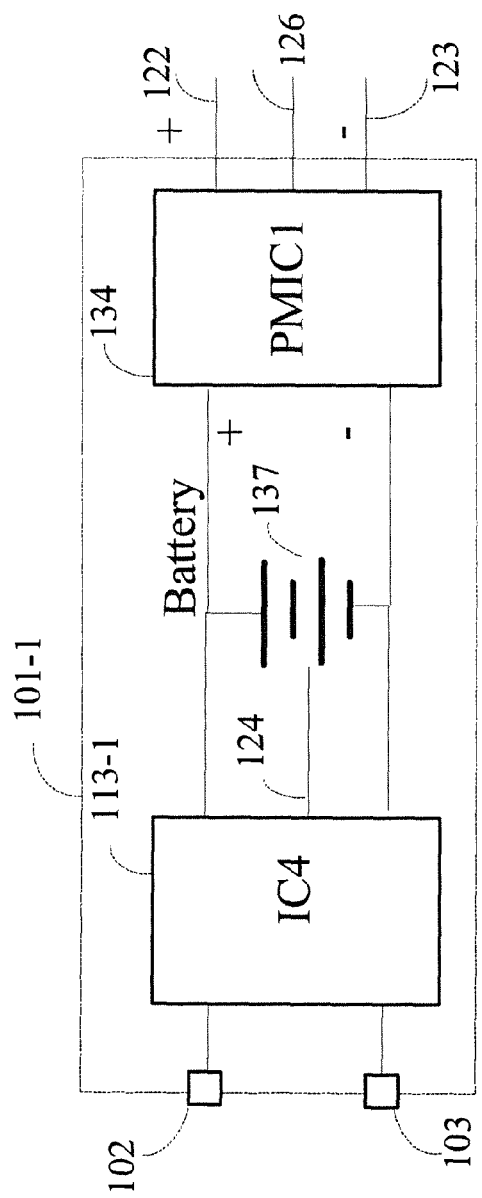
FIG. 13 shows back cover 101-1 on which additional battery 137 and additional integrated circuit 134 are provided.

The back cover of a portable device may include an additional battery to augment battery capacity. FIG. 13 shows back cover 101-1 on which additional battery 137 and additional integrated circuit 134 are provided. Integrated circuit 113-1 both charges battery 134 and supplies an output voltage to integrated circuit 134, which in turn provides terminals 122 and 123 into charging subsystem 125 of portable device 100, in the manner already described above. Terminal 126 may connect to a temperature sensing terminal of a battery.

Figure 14:
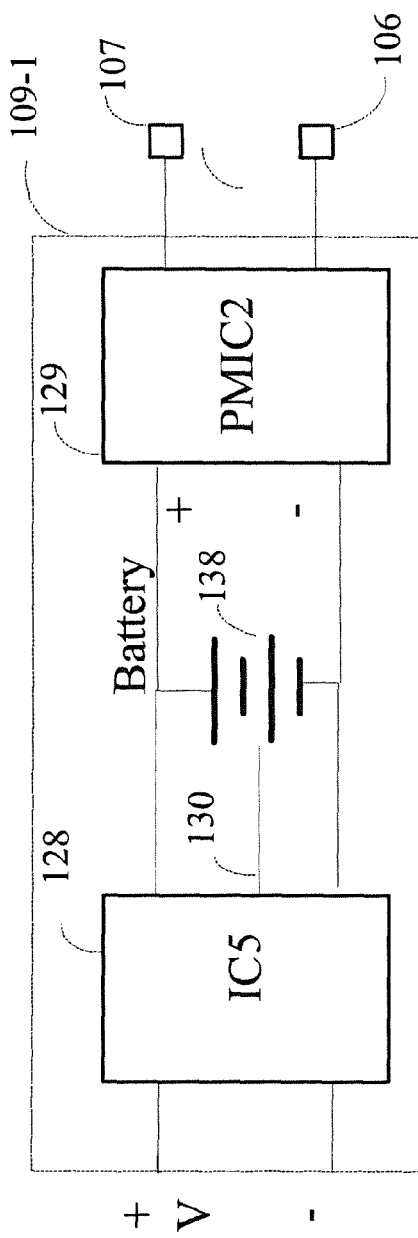
FIG. 14 is a schematic circuit representation in a wireless direct contact charger showing auto-switching and protection circuit 129 and battery charging circuit 128, together with battery 138, according to one embodiment of the present invention.

Wireless direct contact charger 10 may also include a battery to serve as a mobile power source for charging portable devices on the road. FIG. 14 shows control circuitry in wireless direct contact charger 10 which includes power management/charger integrated circuit 128, battery 138 and integrated circuit 129. Integrated circuit 128 both charges battery 134 and supplies an output voltage to integrated circuit 129, which in turn provides an output voltage to plate electrodes 106 and 107 for charging portable devices placed on wireless direct contact charger 10, in the manner already described above. Integrated circuit 129 may perform the polarity detection and protection functions of auto-switching and protection circuit 120. Terminal 130 connects to the temperature sensing terminal of battery 130.

The above detailed description is provided to illustrate specific embodiments of the present invention and is not intended to be limiting. Numerous variations and modifications within the scope of the present invention are possible. The present invention is set forth in the accompanying claims.

I claim:

1. A wireless direct contact charger for a portable device, the portable device having a first electrode and a second electrode provided on one surface of a housing of the portable device separated by a distance, the wireless direct contact charger comprising:
    a voltage supply;
    a first plate electrode and a second plate electrode;
    a polarity detection circuit that detects, when the first electrode or the second electrode of the portable device is placed on the first plate electrode or the second plate electrode, whether the first electrode of the portable device is in contact with the first plate electrode or the second electrode of the portable device is in contact with the first plate electrode; and
    a switching circuit which connects the first plate electrode and the second plate electrode to the voltage supply according to a polarity consistent with the detection by the polarity detection circuit, wherein the first plate electrode and the second plate electrode each have linear dimensions less than the distance between the first electrode and the second electrode of the portable device.

2. The wireless direct contact charger of claim 1, wherein the voltage supply comprises a battery.

3. The wireless direct contact charger of claim 1, further comprising a protection circuit that detects, and protects the wireless direct contact charger from, an electrical short across the first plate electrode and the second plate electrode.

4. The wireless direct contact charger of claim 1, further comprising an electrostatic discharge circuit.

5. A back cover for a portable device, the portable device having a charging subsystem that charges a battery powering the portable device, the back cover being provided to allow charging of the portable device by a wireless direct contact charger, the wireless direct contact charger having a first plate electrode and a second plate electrode each having a surface of two dimensions, the back cover comprising a first electrode and a second electrode which are embedded in the back cover and separated by a distance, the first and second electrode each being electrically connected to the charging subsystem of the portable device, wherein the distance between the first electrode and the second electrode of the portable device is greater than each of the linear dimensions of the first plate electrode and the second plate electrode.

6. The back cover of claim 5, wherein the first electrode comprises a metallic annular ring.

7. The back cover of claim 5, wherein the second electrode comprises a logo, a trademark, lettering or another feature to identify the manufacturer or the model number of the portable device.

8. The back cover of claim 5, further comprising a charger interface circuit that couples the first electrode and the second electrode to corresponding terminals of the charging subsystem.

9. The back cover of claim 8, wherein the back cover further comprises a battery mounted thereon and wherein the charger interface circuit further comprises a battery charging circuit.

10. The back cover of claim 8, wherein the first electrode and the second electrode are coupled to the corresponding terminals of the charging subsystem through a connector.

11. The back cover of claim 10, wherein the connector comprises a USB connector.

12. The back cover claim 8, wherein the charger interface circuit comprises a protection circuit.

13. The back cover of claim 8, wherein the first electrode and the second electrode are coupled to the corresponding terminals of the charging subsystem through metallic contact elements provided on the back cover and a circuit board on which the battery charging subsystem resides.

14. The back cover of claim 8, wherein the first electrode and the second electrode are coupled to the corresponding terminals of the charging subsystem through metallic contact elements provided on the back cover and a battery.

15. The back cover of claim 8, wherein the battery subsystem comprises a charging management circuit and a battery.

16. In a wireless direct contact charger, a method for charging a portable device having a first electrode and a second electrode provided on one surface of a housing of the portable device separated by a distance, wherein the wireless direct contact charger comprises:

a voltage supply;
a first plate electrode and a second plate electrode;
a polarity detection circuit that detects, when the first electrode or the second electrode of the portable device is placed on the first plate electrode or the second plate electrode, whether the first electrode of the portable device is in contact with the first plate electrode or the second electrode of the portable device is in contact with the first plate electrode; and
a switching circuit which connects the first plate electrode and the second plate electrode to the voltage supply according to a polarity consistent with the detection by the polarity detection circuit, wherein the first plate electrode and the second plate electrode each have linear dimensions less than the distance between the first electrode and the second electrode of the portable device;
and wherein the method comprises:
  (a) determining if the portable device is properly placed on either one or both of the first plate electrode and the second plate electrode;
  (b) if the electronic device is properly placed on either or both of the first plate electrode and the second plate electrode, sending an electrical stimulus signal and measuring a response to determine a polarity of the first plate electrode and the second plate electrode of the portable device;
  (c) setting the switching circuit to an appropriate configuration to provide an output voltage to the first plate electrode and the second plate electrode; and
  (d) outputting a charging voltage to the first plate electrode and the second plate electrode through the switching circuit.

17. The method of claim 16, further comprising receiving from the portable device one or more signals representing status information regarding charging in the portable device, and displaying the status information on the wireless direct contact charger.

* * * * *